United States Patent [19]
Rollmann

[11] 3,939,246
[45] Feb. 17, 1976

[54] MANUFACTURE OF CRYSTALLINE ALUMINOSILICATE ZEOLITES

[75] Inventor: Louis D. Rollmann, Princeton, N.J.

[73] Assignee: Mobil Oil Corporation, New York, N.Y.

[22] Filed: Mar. 29, 1974

[21] Appl. No.: 456,565

[52] U.S. Cl. .............................. 423/118; 252/455 Z
[51] Int. Cl.$^2$ ......................................... C01B 33/28
[58] Field of Search .................... 423/118, 329–330; 252/455 Z

[56] References Cited
UNITED STATES PATENTS

| | | | |
|---|---|---|---|
| 943,535 | 12/1909 | Gans | 423/118 |
| 1,140,262 | 5/1915 | Gans | 423/118 |
| 1,477,757 | 12/1923 | Hughes | 423/118 |
| 3,119,659 | 1/1964 | Taggart et al. | 423/118 |
| 3,431,218 | 3/1969 | Plank et al. | 252/455 Z |

*Primary Examiner*—Edward J. Meros
*Attorney, Agent, or Firm*—Charles A. Huggett; Raymond W. Barclay

[57] ABSTRACT

Crystallization of aluminosilicate zeolites of the molecular sieve type either as such or in aggregate combination with clay mineral is accomplished by the addition of a flux constituting an alkali metal salt to a kaolin-type clay prior to calcination and caustic aging of said clay.

9 Claims, No Drawings

MANUFACTURE OF CRYSTALLINE ALUMINOSILICATE ZEOLITES

BACKGROUND OF THE INVENTION

1. Field of the Invention.

Manufacture of crystalline aluminosilicate molecular sieve zeolites by admixing a flux with kaolin-type clay prior to calcination at an elevated temperature and subsequent aging of the calcined clay in caustic solution.

2. Description of the Prior Art.

It has heretofore been known to employ kaolin-type clays in synthesizing crystalline aluminosilicate zeolites as a result of treatment with caustic solution. Thus, U.S. Pat. No. 2,992,068 describes conversion of dehydrated kaolin clay by contact with a relatively concentrated caustic solution at low temperature into a type A zeolite. U.S. Pat. No. 3,037,843 describes treatment of a variety of clay minerals, particularly of the kaolin type, with caustic solution to yield a crystalline sodium aluminosilicate which is then treated with an acid to yield a "permutitic acid" which upon treatment with dilute alkali solution at an elevated temperature yields a crystalline aluminosilicate of the molecular sieve type. U.S. Pat. No. 3,114,603 describes a process which entails digesting an aqueous reactant mixture containing reactive kaolin at a temperature between about 20°C. and about 55°C. for at least 2 hours followed by crystallizing sodium zeolite A in the digested reactant mixture in the temperature range of about 75°C. to about 100°C. for at least 2 hours and recovering crystalline zeolite A as the product. U.S. Pat. No. 3,119,660 describes preparation of a molecular sieve-type crystalline aluminosilicate by contacting kaolin with an aqueous alkaline solution containing a water-soluble alkali metal salt. After a suitable period of digestion, crystallization occurs.

U.S. Pat. No. 3,338,672 describes a method for making a faujasite-type crystalline zeolite by reacting an aqueous sodium hydroxide solution with a mixture of amorphous dehydrated kaolin clays, which clays were produced by calcining kaolin clays at different temperature levels. U.S. Pat. No. 3,391,994 describes a method for producing faujasite-type zeolites by reacting sodium hydroxide solution with kaolin clay that had been calcined under conditions such that the clay had undergone the characteristic kaolin exotherm after it was dehydrated. U.S. Pat. No. 3,414,602 describes conversion of calcined kaolin by reaction with sodium hydroxide and tetramethylammonium hydroxide to yield zeolite N. U.S. Pat. No. 3,458,454 describes a procedure for providing a fluidizable cracking catalyst from calcined kaolin which is converted to pellets of precursor consisting of sodium faujasite in an amorphous matrix. Such pellets after conversion to particle size of less than 2 microns are admixed with sodium silicate, spray dried and finally exchanged by treatment with an ammonium salt.

U.S. Pat. No. 3,367,886 relates to zeolite molecular sieve-kaolin clay composites resulting from crystallizing the zeolite molecular sieve from sources of alkali metal oxide, aluminum oxide, silicon dioxide and water in the presence of raw crystalline kaolin clay while such sources and kaolin clay are intermittently mixed together and in the form of particles of the size and shape desired in the active contact masses. U.S. Pat. No. 3,367,887 describes the production of a catalyst base material obtained by hydrothermal treatment without dehydration of preformed masses of sodium hydroxide solution, calcined amorphous kaolin clays and raw crystalline kaolin clay in a manner such that the zeolite molecular sieve is produced by reaction of the caustic principally with the calcined amorphous clays in situ in the presence of the raw crystalline kaolin clay. U.S. Pat. No. 3,508,867 describes treatment of clays with sodium hydroxide or potassium hydroxide solution, preferably in admixture with a source of silica, followed by calcination at temperatures ranging from 230°F. to 1600°F. to yield a material which is crushed, dispersed in water and digested in the resulting alkaline solution to yield, upon crystallization, a crystalline aluminosilicate. U.S. Pat. No. 3,515,511 relates to preparation of faujasite by calcining raw kaolin at a temperature in the range of 965°C. to 1095°C. to yield a reactive kaolin which upon Differential Thermal Analysis at about 980°C. exhibits an exotherm which is less than 15% of the DTA exotherm of raw kaolin and thereafter contacting the activated kaolin with sodium hydroxide solution. U.S. Pat. No. 3,515,681 and U.S. Pat. No. 3,515,682 describe techniques for transforming calcined kaolin into synthetic faujasite by alkaline aging in sodium hydroxide solution.

SUMMARY OF THE INVENTION

In accordance with the present invention, it has been found that the transformation of kaolin clays to crystalline aluminosilicate zeolites of the molecular sieve type can be facilitated by the addition of a flux material to the kaolin-type clay prior to calcination and aging in a caustic solution.

The process of the invention is particularly applicable for the production of synthetic crystalline zeolites that are similar to the mineral faujasite, i.e. the molecular sieve type zeolites known as zeolite X, described in U.S. Pat. No. 2,882,244 and zeolite Y, described in U.S. Pat. No. 3,130,007 and also zeolite A, described in U.S. Pat. No. 2,882,243.

The above zeolites may be produced either as such, in combination with one another or in aggregate combination with the unconverted or partially converted kaolin clay.

The kaolin clay, treated as herein described, serves as the sole or principal source of silica and alumina in synthesis of the desired crystalline aluminosilicate zeolite. It is, however, with the purview of this invention, if desired, to supplement the reaction mixture from which the zeolite is crystallized with additional sources of silica and alumina such as sodium aluminate, colloidal silica, sodium silicate and silica gel.

The kaolin clay employed in carrying out the invention has the general molar composition $Al_2O_3 . 2SiO_2 . xH_2O$. The $SiO_2/Al_2O_3$ ratio may, however, vary from as low as 1.8 to as high as 2.6. The kaolin-type clays may be considered as sheet-like crystalline silicates. Their basic structural unit is an aluminosilicate sheet consisting of a layer of silicon cations in tetrahedral coordination with oxygen anions, bonded to a layer of aluminum cations in octahedral coordination with oxygen or hydroxyl anions. These sheets, of approximately 7 Angstrom thickness, are stacked one on top of another to form the small plate-like crystals of the mineral. Representative of the kaolin-type clays which contain the above-described two-layer sheet structure are kaolinite, levisite, nacrite, dickite, endellite and halloysite. These clays differ only in the way the basic structural sheets are stacked. It is considered essential to the success of this invention that the clay starting material employed be of the kaolin-type. Other avilable clays, such as attapulgite and hectorite, when subjected to similar treatment, did not undergo the desired transformation to crystalline aluminosilicate zeolites achieved with use of the kaolin-type clays.

A flux material is, in accordance with the invention, initially added to the kaolin-type clay. The amount of flux used will depend on the particular material selected for use but will generally be between about 5 and about 20 weight percent, calculated as alkali metal oxide, of the kaolin clay employed. Suitable fluxes include the salts of alkali metals. Representative of such salts are lithium chloride, lithium bromide, sodium chloride, potassium chloride, sodium bromide, lithium fluoride, sodium carbonate, sodium bicarbonate, borax, potassium carbonate and lithium carbonate.

It is to be noted that the above salts have the ability to flux the kaolin-type clay upon subsequent calcination and, in such regard, are to be distinguished from the alkaline aging solutions, containing one or more alkali metal hydroxides, with which the calcined fluxed kaolin is later brought into contact.

The fluxing salt may be added to the kaolin-type clay in any feasible manner. Generally, the salt is added in the form of an aqueous solution of sufficient concentration to insure that the amount of flux material is between about 5 and about 20 weight percent, calculated as alkali metal oxide, of the kaolin clay. Preferably, the flux employed will be an alkali metal halide or carbonate and particularly the salts of sodium such as sodium chloride and sodium carbonate. With use of the latter, for example, the amount added to the kaolin clay is such as to give a mole ratio of $Na_2O/SiO_2$ of approximately 0.4, based on the assumption that separation into alumina-rich and silica-rich phases occurs on subsequent calcination.

After addition of the fluxing salt to the kaolin-type clay, the latter is subjected to an elevated temperature by calcining at between about 880°C. and 1100°C. for a sufficient time for the clay to undergo the characteristic kaolin exotherm after dehydration is completed, generally between about 1 and 12 hours. When the calcination temperature is substantially below 925°C., some of the kaolin clay may not undergo the exotherm after dehydration. Alternatively, the flux-kaolin mixture may be spray dried at temperatures in the range of about 450° to about 750°C. prior to calcination. The presence of dehydrated kaolin clay which has not undergone the characteristic exotherm usually yields a product in which the silica to alumina ratio is undesirably low insofar as the formation of synthetic faujasite-type zeolites is concerned. When a major quantity of dehydrated kaolin which has not undergone the exotherm is present in the aqueous reaction mixture, zeolite A or other zeolites of lower silica to alumina ratio than those of the synthetic faujasites are obtained. When calcination exceeds about 1100°C. for an appreciable time, the resulting material is not suitable for crystalline zeolite production. The manner of determining the presence of the characteristic kaolin exotherm at about 980°C. is well known and described in the literature, see, for example "Clay Minerology" by Grim, page 203, McGraw Hill (1953).

The fluxed calcined kaolin-type clay, suitably in finely-divided form, is then subjected to alkaline aging by exposure to an aqueous caustic (sodium hydroxide) solution. A portion of the sodium hydroxide can be replaced by stoichiometrically equivalent amounts of potassium hydroxide, lithium hydroxide, or tetraalkylammonium hydroxide, either singly or in combination. Generally, and preferably, however, sodium hydroxide will be employed utilizing solutions of approximately 5 to 20 weight percent concentration. A particularly feasible concentration of sodium hydroxide is that sufficient to give a $Na_2O/SiO_2$ ratio of about 0.6, based on the assumption that calcination of the kaolin clay effected a separation into alumina-rich and silica-rich phases.

Crystallization of the aluminosilicate zeolite is effected by maintaining the resulting reaction mixture at a temperature appreciably below the boiling point, generally at at temperature within the approximate range of 30° to 110°C. Preferably, the temperature will be maintained within the upper portion of the above range, i.e. between about 80° and about 95°C. to insure crystallization within a reasonable period of time. The crystallized reaction product is formed directly as a solid or semi-solid mass. In some instances, the zeolite crystals formed may be removed from the reaction mixture by suitable means such as filtration or centrifuging. The separated zeolite-containing product may thereafter be dried, calcined, steam-treated, if desired, and/or ion-exchanged to replace the cations existing in the crystalline aluminosilicate as formed with more desirable cations, depending on the end use of the zeolite product, which may involve either sorption or catalysis.

When intended for use as a catalyst suitable for conversion of hydrocarbons, the form of the zeolite obtained, i.e. the sodium form, may be ion-exchanged with other cations such as ammonium, hydrogen, nickel, titanium, chromium, iron, manganese, vanadium, cobalt, zinc, aluminum and the rare earths and mixtures of the foregoing ions. Ion exchange may be accomplished utilizing well-known zeolite exchange techniques, for example, such as described in U.S. Pat. No. 3,140,249 and U.S. Pat. No. 3,140,253. The product can also be impregnated with elemental metals or the oxides or sulfides of such metals to yield catalytically active contact materials useful in hydrocarbon conversion reactions, such as hydrocracking, isomerization, alkylation, disproportionation and polymerization. The principal application contemplated for zeolites produced in accordance with the present invention resides in the field of catalysis and particularly in catalytic cracking of hydrocarbon charge stocks, such as gas oil, to lighter hydrocarbons boiling in the gasoline range.

Crystallization from aggregates calcined below about 925°C. may be controlled to yield a substantially 100% conversion to crystalline aluminosilicate zeolite. Alternatively, crystallization from more severely calcined mixtures of clay and flux will commonly yield a product which is an aggregate mixture of the unreacted or partially reacted kaolin-type clay and the crystalline aluminosilicate molecular sieve type zeolite.

In a preferred embodiment, the synthesis of zeolites in varying proportion in intimate mixtures with the kaolin-type clay gives rise to a product characterized by excellent attrition resistance. The manner and degree of interaction between the fluxed and calcined kaolin-type clay and alkaline solution can be used to control the ratio between kaolin-type clay and crystalline aluminosilicate produced. Thus, at sodium hydroxide concentrations substantially below 5 weight percent, crystallization to zeolite may not occur. At sodium hydroxide concentrations substantially above 20%, crystallization may proceed to undesirable, dense structures such as sodalite.

To obtain high yields of the desired zeolite, it may be further advantageous to maintain the temperature of alkaline aging between about 30° and about 60°C. for at least 3 hours, preferably 24 to 48 hours, prior to subsequent crystallization at temperatures within the range of about 70° to about 110°C.

DESCRIPTION OF SPECIFIC EMBODIMENTS

The following examples will serve to illustrate the process of this invention without limiting the same:

EXAMPLE 1

Thirty grams of air-dried kaolinite having the following composition:

|  | Weight Percent |
|---|---|
| $SiO_2$ | 51.9 |
| $Al_2O_3$ | 39.4 |
| Na | 0.03 |
| K | 0.23 |
| Mg | 0.02 |
| Ca | 0.03 |
| Fe | 1.1 |
| Remainder | 7.3 |
| Ash | 85.5 | were combined with 40 cc of 14 weight percent aqueous $Na_2CO_3$ solution, air-dried and thereafter calcined from 400°C. to 940°–950°C. in 2 hours 10 minutes. The amount of $Na_2CO_3$ added was calculated to give a constant mole ratio of $Na_2O/SiO_2 = 0.4$ after assumption that partial separation into alumina-rich and silica-rich phases would occur on calcination.

A 5 gram sample of the so treated kaolinite was ground to about 100 mesh, combined with 3.9 cc of a 3 M aqueous sodium hydroxide solution to give a $Na_2O/SiO_2$ ratio of 0.6 and then aged at 85°–90°C. for 3 days. At the end of this time, analyses of the resultant product showed the same to contain approximately 25 weight percent of crystallized zeolite constituting a mixture of synthetic faujasite and zeolite P.

EXAMPLE 2

The procedure of Example 1 was repeated but water in an equal volume amount was used in place of the aqueous $Na_2CO_3$ solution and 9.7 cc of the 3 M aqueous sodium hydroxide solution was employed to provide the $Na_2O/SiO_2$ ratio of 0.6. In such instance, in the absence of sodium carbonate flux, no formation of crystalline aluminosilicate zeolite was observed.

EXAMPLE 3

Fifteen grams of the kaolinite clay described in Example 1 were combined with 20 cc of a 7 weight percent aqueous solution of sodium chloride, air-dried and thereafter calcined from 200° to 910°C. in 2 hours.

A five gram sample of the so treated kaolinite was finely ground and combined with 3 cc of a 3 M aqueous sodium hydroxide solution and then aged at 85°–90°C. for 2 days. At the end of such time, analysis of the resultant product showed the same to contain approximately 11 weight percent of zeolite A.

EXAMPLE 4

The procedure of Example 3 was repeated but water in an equal volume amount was used in place of the aqueous sodium chloride solution. In the absence of the sodium chloride flux, no formation of crystalline aluminosilicate zeolite was observed.

EXAMPLE 5

Fifteen grams of halloysite having the following composition:

|  | Weight Percent |
|---|---|
| $SiO_2$ | 57.2 |
| $Al_2O_3$ | 38.6 |
| Na | 0.01 |
| K | 0.01 |
| Mg | 0.02 |
| Ca | 0.04 |
| Fe | 1.6 |
| Remainder | 2.5 |
| Ash | 82.3 | were treated as described in Example 3. The resulting product was found to contain approximately 10 weight percent of zeolite A.

EXAMPLE 6

The procedure of Example 5 was repeated but water in an equal volume amount was used in place of the aqueous sodium chloride solution. In the absence of the sodium chloride flux, no formation of crystalline aluminosilicate zeolite was observed.

EXAMPLE 7

Fifteen grams of attapulgite having the following composition:

|  | Weight Percent |
|---|---|
| $SiO_2$ | 69.2 |
| $Al_2O_3$ | 10.2 |
| Na | 0.03 |
| K | 0.50 |
| Mg | 7.3 |
| Ca | 1.5 |
| Fe | 2.4 |
| Remainder | 8.9 |
| Ash | 82.0 | were treated both with sodium chloride solution as described in Example 3 and with water as described in Example 4. In neither instance was crystalline aluminosilicate zeolite formed.

EXAMPLE 8

Fifteen grams of hectorite having the following composition:

|  | Weight Percent |
|---|---|
| $SiO_2$ | 45.7 |
| $Al_2O_3$ | 0.89 |
| Na | 1.2 |
| K | 0.17 |
| Mg | 11 |
| Ca | 4.5 |
| Fe | 0.30 |
| Remainder | 36.2 |
| Ash | 75.3 | were treated both with sodium chloride solution as described in Example 3 and with water as described in Example 4. In neither instance was crystalline aluminosilicate zeolite formed.

I claim:
1. A process for effecting conversion of kaolin-type clays to crystalline aluminosilicate molecular sieve zeolites of the faujasite type which comprises:
   a. mixing the kaolin-type clay with a flux constituting a halide or carbonate of an alkali metal corresponding to between about 5 and about 20 weight percent, calculated as alkali metal oxide, of the kaolin-type clay;
   b. calcining the resulting mixture at a temperature within the approximate range of 880° to 1100°C. for a sufficient time for the clay to undergo the characteristic kaolin exotherm after dehydration is completed; and
   c. aging the fluxed calcined kaolin-type clay in an aqueous solution of sodium hydroxide of approximately 5 to 20 weight percent concentration at a temperature within the approximate range of 30° to 110°C. until crystallization of the aluminosilicate zeolite is achieved.

2. The process of claim 1 wherein the kaolin-type clay is kaolinite.

3. The process of claim 1 wherein the kaolin-type clay is halloysite.

4. The process of claim 1 wherein said temperature of calcining is within the approximate range of 925° to 1100°C.

5. The process of claim 1 wherein said flux is sodium chloride.

6. The process of claim 1 wherein said flux is sodium carbonate.

7. The process of claim 1 wherein said flux is an alkali metal halide.

8. The process of claim 1 wherein said flux is an alkali metal carbonate.

9. The process of claim 1 wherein the temperature of aging is between about 80° and about 95°C.

* * * * *